UNITED STATES PATENT OFFICE.

OSCAR ALTPETER, OF MILWAUKEE, WISCONSIN.

PLASTIC COMPOSITION.

1,211,382. Specification of Letters Patent. Patented Jan. 9, 1917.

No Drawing. Application filed January 8, 1915. Serial No. 1,154.

*To all whom it may concern:*

Be it known that I, OSCAR ALTPETER, a citizen of the United States, residing at Milwaukee, in the county of Milwaukee and State of Wisconsin, have invented a certain new and useful Improvement in Plastic Compositions, of which the following is a full, clear, concise, and exact description.

My invention relates to a new composition of matter of use more particularly in connection with roofing.

Although the use of my improved composition is not to be so limited, I will herein however describe its advantageous features in connection with roofing and its manner of manufacture.

My improved composition in one form of carrying out my invention is used in the form of sheets which may have the size of ordinary shingles and which sheets can thus be used to construct a roof similarly as when wooden shingles are used.

The advantages of my improved composition of matter are its fire proof qualities. As is well understood wooden shingles present a greater fire hazard than any other one single item of construction, and to obviate this requires the use of some fireproof material which is cheap and stands the ravages of the elements, which lends itself readily to production in sheets; which is not of great weight, and which can readily be attached in position. My improved composition of matter has all of these qualifications.

In order to compound my improved composition I use as the base a granulated slag. This granulated slag may be obtained from blast furnaces or under similar conditions, it being usually obtained by being thrown into water while in molten condition to form the granulated slag referred to. This granulated slag I then grind to a fineness of twenty mesh. This finely comminuted slag is then mixed with asphalt and asbestos fiber. Water-granulated slag of the kind here referred to has particular advantages for my purposes because of its porous texture and voluminous character which favor ready and thorough penetration by and commixture with a liquid binder such as hot asphalt.

One specific form of proportions which I have found of value is the following:

| | |
|---|---|
| Granulated slag | 55% |
| Asphalt | 35% |
| Asbestos fiber | 10% |
| | 100%. |

The above ingredients are then thoroughly mixed in a steam jacketed mixer or kneader at a temperature not exceeding 140° C. After being thoroughly mixed for one-half an hour the mixture is dumped into a hopper and is of such a consistency that it can be readily rolled into sheets and then cut into the desired shape. The resultant composition is practically fireproof and can be readily worked.

From what has been described the nature of my improved composition of matter and its qualities will be readily apparent to those skilled in the art.

Having however thus described a specific form of my invention, what I claim as new and desire to secure by Letters Patent is:

1. As a new article of manufacture, a composition for roofing or the like comprising comminuted granulated slag in intimate commixture with asbestos fiber and an asphalt binder, said slag constituting approximately 55 per cent. of the mixture.

2. As a new article of manufacture, a composition for roofing or the like comprising comminuted granulated slag in intimate commixture with asbestos fiber and an asphalt binder, the constituents of the mixture being present approximately in the following proportions: slag, 55 per cent.; asbestos fiber, 10 per cent.; asphalt binder, 35 per cent.

In witness whereof, I hereunto subscribe my name this 18th day of August, A. D., 1914.

OSCAR ALTPETER.

Witnesses:
 MAX W. ZABEL,
 HAZEL ANN JONES.